(12) United States Patent
Takahashi

(10) Patent No.: US 9,883,438 B2
(45) Date of Patent: Jan. 30, 2018

(54) COMMUNICATION APPARATUS, CONTROL METHOD THEREOF, AND PROGRAM

(71) Applicant: CANON KABUSHIKI KAISHA, Tokyo (JP)

(72) Inventor: Takumi Takahashi, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 30 days.

(21) Appl. No.: 15/021,925

(22) PCT Filed: Sep. 10, 2014

(86) PCT No.: PCT/JP2014/004654
§ 371 (c)(1),
(2) Date: Mar. 14, 2016

(87) PCT Pub. No.: WO2015/040827
PCT Pub. Date: Mar. 26, 2015

(65) Prior Publication Data
US 2016/0234742 A1 Aug. 11, 2016

(30) Foreign Application Priority Data
Sep. 18, 2013 (JP) .................................. 2013-193042

(51) Int. Cl.
*H04B 5/00* (2006.01)
*H04W 36/14* (2009.01)
(Continued)

(52) U.S. Cl.
CPC ........... *H04W 36/14* (2013.01); *H04W 4/008* (2013.01); *H04W 36/0066* (2013.01);
(Continued)

(58) Field of Classification Search
CPC .... H04W 36/14; H04W 4/008; H04W 76/003
(Continued)

(56) References Cited

U.S. PATENT DOCUMENTS

2012/0289154 A1 11/2012 Son et al.
2012/0290731 A1 11/2012 Suumaeki et al.

FOREIGN PATENT DOCUMENTS

JP 2011-193474 A 9/2011

OTHER PUBLICATIONS

International Search Report and Written Opinion for PCT/JP2014/004654 and notification of transmittal of the ISR/WO dated Jan. 26, 2015.

(Continued)

*Primary Examiner* — Lee Nguyen
(74) *Attorney, Agent, or Firm* — Canon USA, Inc. I.P. Division

(57) ABSTRACT

A communication apparatus includes a communication unit configured to perform wireless communication with another communication apparatus using a first communication method, a setting unit configured to set priority to each of a plurality of communication processing included in a record which is used in communication using the communication unit for performing handover from the first communication method to a second communication method that is different from the first communication method and which is for designating the second communication method, and a transmission unit configured to transmit the record including the plurality of information indicating the priority set by the setting unit to the another communication apparatus via the communication unit. As a result, the priority of each of the plurality of auxiliary information included in the record for indicating the communication method to which handover can be performed can be notified.

11 Claims, 14 Drawing Sheets

(51) Int. Cl.
     *H04W 4/00*      (2009.01)
     *H04W 76/04*     (2009.01)
     *H04B 7/00*       (2006.01)
     *G06F 3/12*       (2006.01)
     *H04W 36/00*     (2009.01)
     *H04W 84/12*     (2009.01)

(52) U.S. Cl.
     CPC ......... *H04W 76/043* (2013.01); *G06F 3/1292* (2013.01); *H04W 36/0055* (2013.01); *H04W 36/0072* (2013.01); *H04W 84/12* (2013.01)

(58) Field of Classification Search
     USPC .............................................. 455/41.1, 552.1
     See application file for complete search history.

(56) References Cited

OTHER PUBLICATIONS

NFC Forum, Connection Handover, Technical Specification, NFC ForumTM, Connection Handover 1.2, Jul. 7, 2010, available at http://www.cardsys.dk/download/NFC_Docs/NFC%20Connection%20Handover%201.2%20Technical%20Specification.pdf.

COMMUNICATION APPARATUS, CONTROL METHOD THEREOF, AND PROGRAM

TECHNICAL FIELD

The present invention relates to a communication technique.

BACKGROUND ART

In recent years, proximity wireless communication such as Near Field Communication (NFC), Infrared Data Association (IrDA), and TransferJet (registered trademark) has come into use in mobile phones. Data can be transmitted and received between the mobile phones employing proximity wireless communication by users only bringing the mobile phones close to each other. Further, Japanese Patent Application Laid-Open No. 2011-193474 discusses a technique for performing handover from such proximity wireless communication to a different wireless communication method such as a wireless local area network (LAN) (i.e., Institute of Electrical and Electronic Engineers (IEEE) 802.11 series) and Bluetooth (registered trademark).

Furthermore, a protocol for performing handover from NFC to a different wireless communication method such as the wireless LAN and Bluetooth (registered trademark) has been standardized as an international standard (i.e., NFC Forum Connection Handover 1.2). NFC Forum Connection Handover 1.2 defines a record for indicating the communication method to which handover can be performed from the NFC. Such a record can include a plurality of messages for performing handover, and priority of each of the plurality of messages can also be indicated therein. Further, the record can include a plurality of auxiliary information of the communication method indicated by the record.

According to NFC Forum Connection Handover 1.2, a communication apparatus can use the priority of the record for indicating the communication method which can be performed handover and notify another communication apparatus of the desired communication method for performing handover to. For example, if the communication apparatus supports both the wireless LAN and Bluetooth (registered trademark), the communication apparatus can notify a partner apparatus of NFC, based on the priorities of the records, of a communication method to be employed for communicating after performing handover.

However, according to NFC Forum Connection Handover 1.2, the priorities of the auxiliary information of the communication methods are not considered even if the communication apparatus can notify of the priorities of the communication methods. As a result, if the record includes a plurality of auxiliary information, a receiving apparatus cannot determine which auxiliary information is desired to be employed by a transmitting apparatus.

CITATION LIST

Patent Literature

Japanese Patent Application Laid-Open No. 2011-193474

SUMMARY OF INVENTION

According to an aspect of the present invention, a communication apparatus includes a first communication unit configured to perform wireless communication with another communication apparatus using a first communication method, a second communication unit configured to perform wireless communication for performing communication processing with the another communication apparatus using a second communication method which is different from the first communication method, a setting unit configured to set priority to each of a plurality of communication processing associated with a record which is used for performing handover from the first communication method to the second communication method and which is for designating the second communication method, and a transmission unit configured to transmit information of the plurality of communication processing indicating the priority set by the setting unit associated with the record to the another communication apparatus via the first communication unit.

Further features of the present invention will become apparent from the following description of exemplary embodiments with reference to the attached drawings.

DESCRIPTION OF EMBODIMENTS

Various exemplary embodiments, features, and aspects of the invention will be described in detail below with reference to the drawings.

The exemplary embodiments to be described below are directed to notifying of the priority of each of a plurality of auxiliary information included in a record for indicating a communication method which can perform handover.

Figure 1:
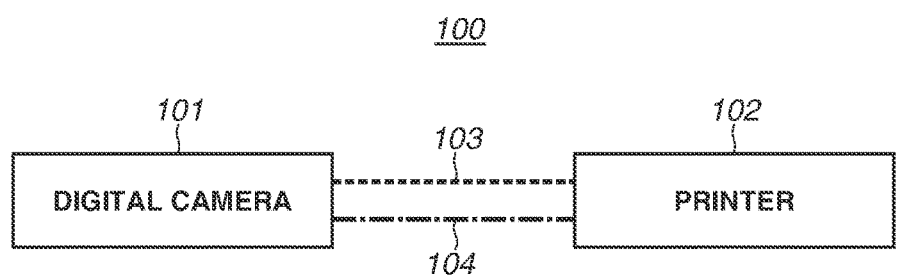
FIG. 1 illustrates an example of a system configuration according to an exemplary embodiment of the present invention.

The communication apparatuses and the communication system according to the present exemplary embodiment will be described below with reference to the drawings. FIG. 1 illustrates a device configuration of a system 100 according to the present exemplary embodiment. Referring to FIG. 1, communication apparatuses 101 and 102 are respectively a digital camera 101 and a printer 102. The digital camera 101 and the printer 102 are communicable with each other employing NFC 103 and wireless LAN communication 104.

Figure 2:
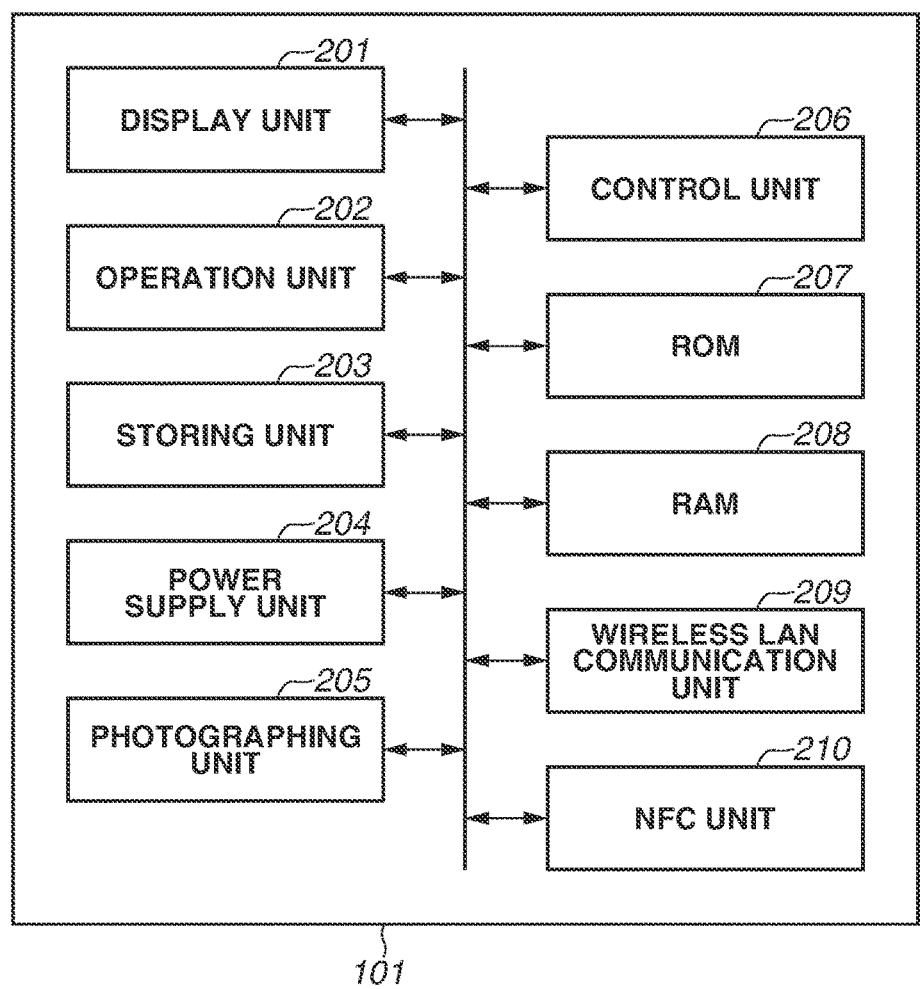
FIG. 2 illustrates an example of a hardware configuration of a communication apparatus (i.e., a digital camera) according to the exemplary embodiment.

FIG. 2 illustrates a hardware configuration of the digital camera 101.

Referring to FIG. 2, the digital camera 101 includes a display unit 201, an operation unit 202, a storing unit 203, a power supply unit 203, a photographing unit 204, a control unit 206, a read-only memory (ROM) 207, a random access memory (RAM) 208, a wireless LAN communication unit 209, and a NFC unit 210.

The display unit 201, such as a liquid crystal display (LCD) or a light emitting diode LED), has a function for outputting information which is visually recognizable, and displays a user interface (UI) with respect to an application. The operation unit 202 has a function for a user to perform various types of input and operate the communication apparatus. The storing unit 203, such as a hard disk drive (HDD), stores and manages various data including wireless communication network information, data transmission/reception information, and image data. The power supply unit 204, such as a battery, includes a power supply for the entire apparatus to operate, and supplies power to each hardware. The photographing unit 205 includes an image sensor and lens, and photographs still images and moving images. The control unit 206, such as a central processing unit (CPU), controls the operations of each element in the digital camera 101.

The ROM 207 stores control commands, i.e., programs. Each of the operations to be described below is realized by the control unit 206 executing the control programs stored in the ROM 207. The RAM 208 is used as a work memory for executing the programs and temporarily storing the data. The wireless LAN communication unit 209 performs the wireless LAN communication 104. More specifically, according to the present exemplary embodiment, the wireless LAN communication unit 209 performs a wireless LAN conforming to IEEE 802.11 series. However, other communication methods such as Bluetooth (registered trademark) may also be employed.

The NFC unit 210 performs NFC 103, i.e., performs wireless communication conforming to NFC. Further, when a communicable apparatus is detected within a communication range, the NFC unit 210 automatically establishes the NFC 103. According to the present exemplary embodiment, the NFC unit 210 performs wireless communication comforting to NFC. However, the NFC unit 210 may employ a communication method in which a communication distance is shorter than the communication method employed by the wireless LAN communication unit 209. Further, the NFC unit 210 may employ a communication method in which a communication speed is slower than the communication method employed by the wireless LAN communication unit 209.

Figure 3:
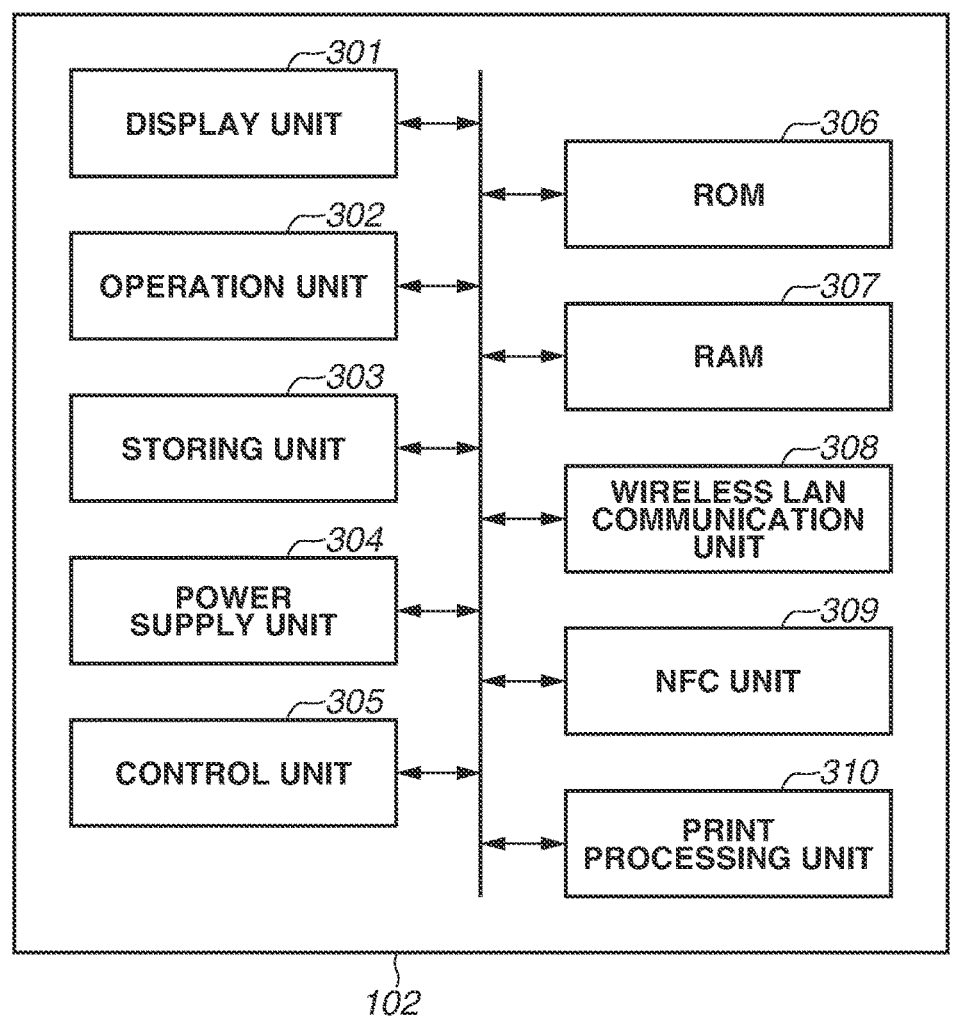
FIG. 3 illustrates an example of a hardware configuration of a communication apparatus (i.e., a printer) according to the exemplary embodiment.

FIG. 3 illustrates a hardware configuration of the printer 102. Referring to FIG. 3, the printer 102 includes a print processing unit 310 instead of the photographing unit 205 in the digital camera 101. The print processing unit 310 prints the image data stored in the storing unit 303. Since the other elements are similar to those in the digital camera 101, description thereof will be omitted.

Figure 4:
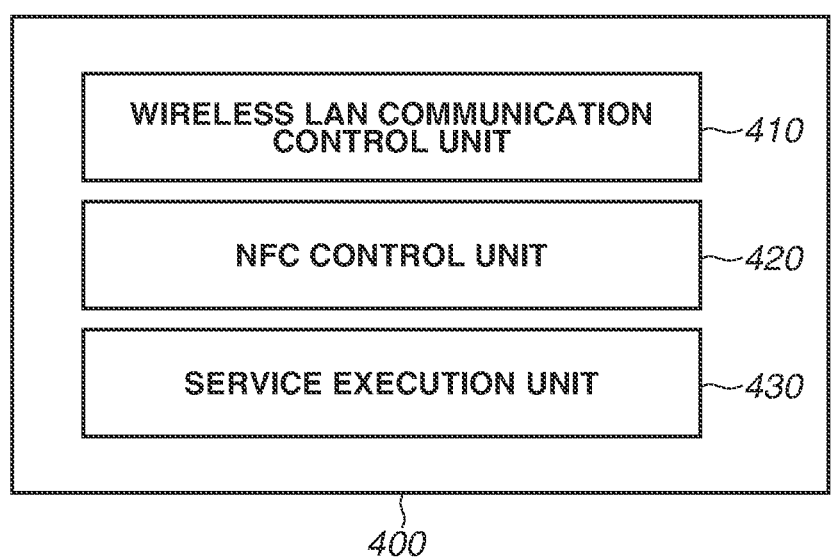
FIG. 4 is a functional block diagram illustrating the communication apparatus (i.e., the digital camera) according to the exemplary embodiment.
Figure 5:
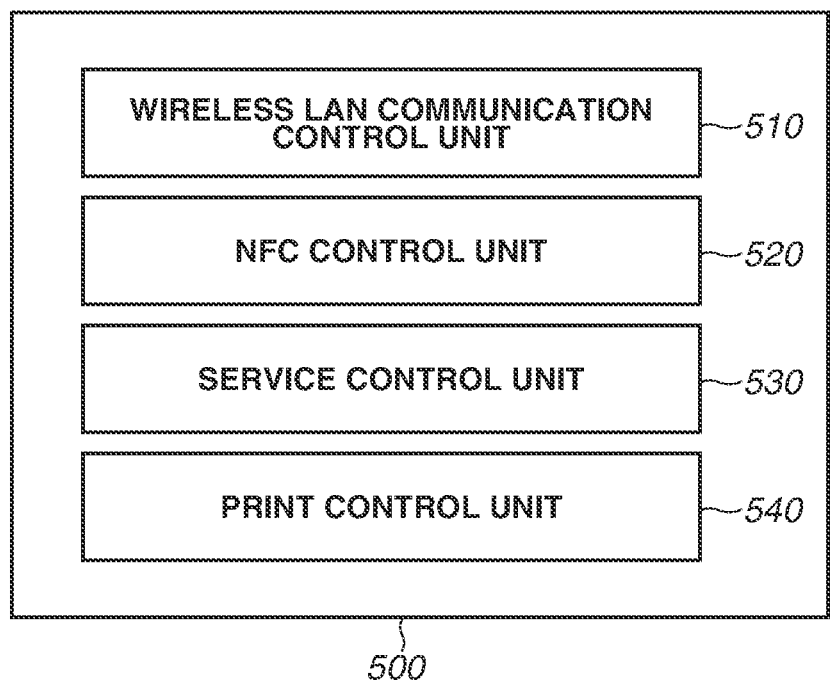
FIG. 5 is a functional block diagram illustrating the communication apparatus (i.e., the printer) according to the exemplary embodiment.

FIGS. 4 and 5 are functional block diagrams of the digital camera 101 and the printer 102. According to the present exemplary embodiment, the functional blocks of the digital camera 101 and the printer 102 are respectively stored in the ROM 207 and a ROM 306, and the functions thereof are implemented by the control unit 206 and a control unit 305 executing the programs. The control unit 206 and the control unit 305 perform control of each of the hardware, perform calculations and processing of the information, and thus realize each of the functions. A portion or the whole of the functional block may also be realized by hardware. In such a case, the portion or the whole of the functional block is configured by an application specific integrated circuit (ASIC).

FIG. 4 is a functional block diagram (400) of the digital camera 101. Referring to FIG. 4, the digital camera 101 includes a wireless LAN communication control unit 410, a NFC control unit 420, and a service execution unit 430.

The wireless LAN communication control unit 410 controls wireless LAN communication performed via the wireless LAN communication unit 209. Further, the wireless LAN communication control unit 410 includes a station function for operating as a terminal of the wireless LAN, and an access point (AP) function for operating as an access point. The NFC control unit 420 controls NFC performed via the NFC unit 210. The service execution unit 430 manages information on the services of external devices which the digital camera 101 is capable of performing using the wireless LAN communication control unit 410, and executes the services. The service execution unit 430 manages identifiers of the services, execution procedures of the services corresponding thereto, and option information of the services as the service information. According to the present exemplary embodiment, the digital camera 101 is capable of executing two types of services, i.e., a "print service A" and a "print service B".

FIG. 5 is a functional block diagram (500) of the printer 102. Referring to FIG. 5, the printer 102 includes a wireless LAN communication control unit 510, a NFC control unit 520, a service control unit 530, and a print control unit 540.

The wireless LAN communication control unit 510 controls wireless LAN communication performed via the wireless LAN communication unit 308. Further, the wireless LAN communication control unit 510 includes the station function for operating as the terminal of the wireless LAN, and the AP function for operating as the access point. The NFC control unit 520 controls NFC performed via an NFC unit 309.

The service control unit 530 manages the information on the services which the printer 102 is capable of providing to the external devices via the wireless LAN communication control unit 510, and executes the services. The service control unit 530 manages the identifiers of the services, the execution procedures of the services corresponding thereto, and the option information of the services as the service information. According to the present exemplary embodiment, the printer 102 is capable of performing three types of services, i.e., the "print service A", a "print service C", and a "print service D".

The print control unit 540 is a functional unit configured to control print processing performed by the print processing unit 310. The service control unit 530 controls the print control unit 540 according to a request from the external device, and is capable of printing the print data received from the external device.

The operation of the communication system having the above-described configuration will be described below.

First Exemplary Embodiment

Operation procedures of the digital camera 101 and the printer 102 according to a first exemplary embodiment of the present invention will be described below with reference to the flowcharts illustrated in FIGS. 6 and 7.

Figure 6:
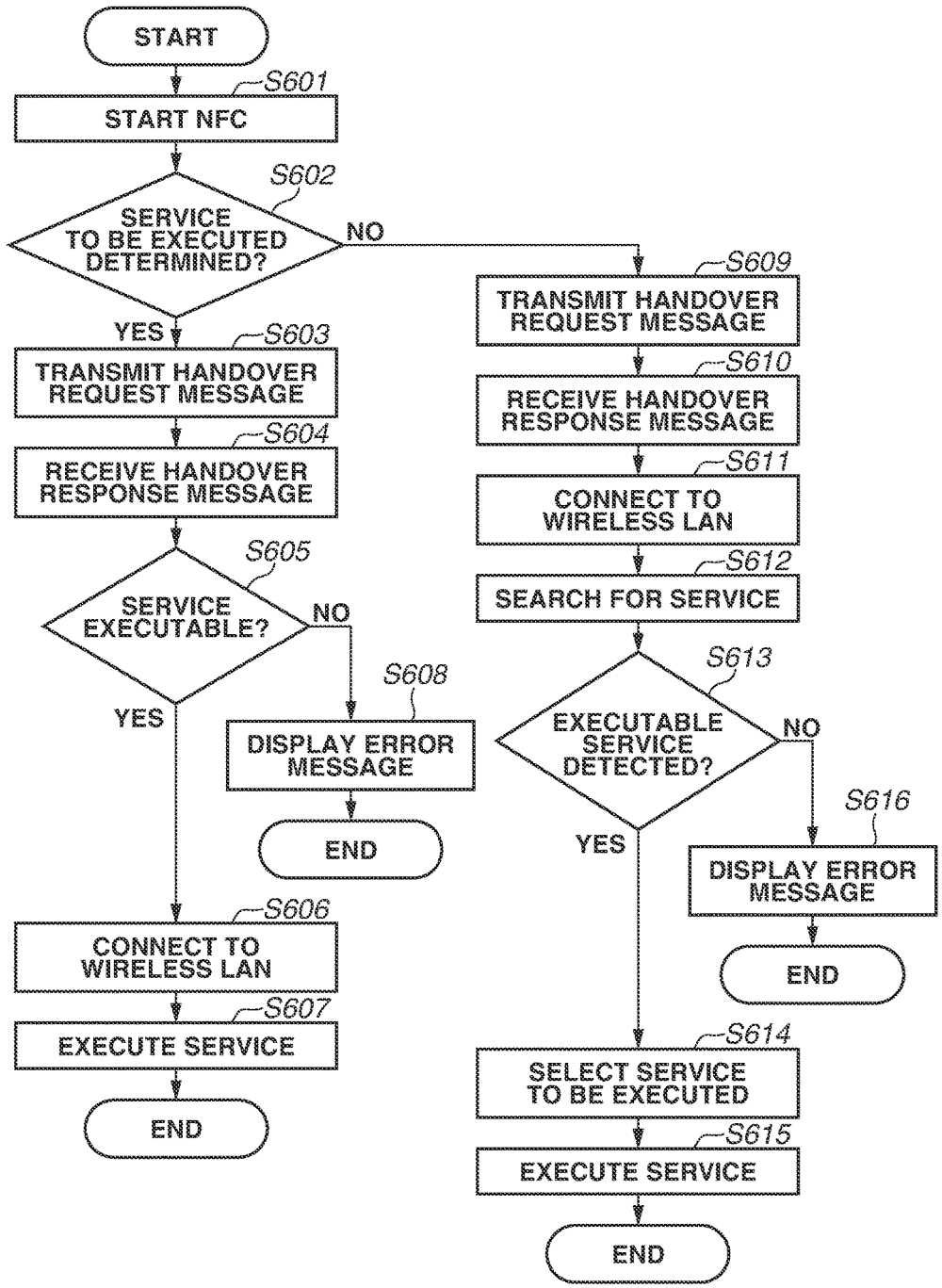
FIG. 6 is a flowchart illustrating an operation of a communication apparatus (i.e., a digital camera) according to a first exemplary embodiment of the present invention.

FIG. 6 is a flowchart illustrating operation procedures of the digital camera 101 when the digital camera 101 and the printer 102 are brought close to each other by a user operation.

In step S601, upon detecting proximity of the NFC unit 309 in the printer 102, the NFC control unit 420 in the digital camera 101 establishes communication with the printer 102 employing NFC. In step S602, the control unit 206 in the digital camera 101 determines whether a service to be executed along with the printer 102 has been decided. According to the present exemplary embodiment, the service to be executed is decided by the user operation received by the operation unit 202. The determination result in step S602 changes according to the user operation performed before the digital camera 101 starts to communicate employing NFC. In other words, the determination in step S602 is performed according to whether the digital camera 101 connects to the printer 102 via the NFC unit 210 in a state where the service to be executed has been selected or has not been selected.

If the service to be performed between the digital camera 101 and the printer 102 has been decided (YES in step S602), the process proceeds to step S603. In step S603 to step S608, the digital camera 101 determines whether the service is executable employing NFC. On the other hand, if the service to be performed between the digital camera 101 and the printer 102 has not been decided (NO in step S602), the process proceeds to step S609. In step S609 to step S616, the digital camera 101 connects to the printer 102 via wireless LAN communication and determines whether the service is executable employing wireless LAN communication.

In step S603, the NFC control unit 420 transmits a handover request message including identifier information of the service to be executed to the printer 102 using the NFC unit 210. The handover request message is a message requesting for connection parameters which are necessary for establishing a new connection employing a communication method different from NFC. According to the present exemplary embodiment, the handover request message is a Handover Request message defined in NFC Forum Connection Handover Technical Specification.

The handover request message transmitted in step S603 includes a record indicating carrier information. According to the present exemplary embodiment, the record is ALTERNATIVE_CARRIER_RECORD defined in the NFC Forum Connection Handover Technical Specification. The record includes the carrier information for identifying the communication method in which handover can be performed indicated by the record, and a plurality of auxiliary information. According to the present exemplary embodiment, the carrier information is the information indicated by CARRIER_DATA_REFERENCE defined in the NFC Forum Connection Handover Technical Specification. One record stores one piece of carrier information. The carrier information may also include a type of the carrier such as wireless LAN, Wireless Fidelity (Wi-Fi) independent basic service set (IBSS), and Bluetooth (registered trademark), and a power state of each wireless carrier (e.g., active state or inactive state).

Further, according to the present exemplary embodiment, the auxiliary information is information indicated by AUXILIARY_DATA_REFERENCE defined in the NFC Forum Connection Handover Technical Specification. The auxiliary information stores the identifier information of the service to be executed. According to the present exemplary embodiment, the identifier of the service is an integer value uniquely associated with the service of which the specification is individually defined. Further, one record can store the identifier information of a plurality of services. If the identifier information of a plurality of services is stored in one record, the information indicating the priority of each of the identifier information of a plurality of services is further stored as the auxiliary information. Furthermore, attached information of the service may also be included in the handover request message other than the identifier of the service. For example, the information on an encoding format of a file to be printed, a printing sheet size, a print color, and whether to perform two-sided printing may be added and transmitted.

According to the present exemplary embodiment, it is assumed that "print service A" is selected as the desired service, and "color printing" is selected as the service of the highest priority in the digital camera 101. Further, "print service A" and "monochrome printing" is selected as second priority. In both cases, a "wireless LAN" is selected as the desired communication method.

In step S604, the NFC control unit 420 receives a handover response message from the printer 102 via NFC. According to the present exemplary embodiment, the handover response message is Handover Select message defined in the NFC Forum Connection Handover Technical Specification. Further, the handover response message includes information indicating whether each of the plurality of services transmitted in step S603 is executable by the printer 102.

In step S605, the digital camera 101 determines whether the service is executable based on the handover response message. If the service is executable (YES in step S605), the service of the highest priority among the services which are executable according to the response is determined to be executed without receiving a further user operation. The digital camera 101 then performs a process for connecting to the communication method corresponding to the carrier information associated with the service determined to be executed. The process proceeds to step S606. In step S606, the digital camera 101 connects to the network of the communication method after performing handover according to the connection parameters included in the received response message. The connection parameters are information for connecting to the network to be configured by the printer 102 as the access point. The connection parameters include all or at least one of a service set identifier (SSID), an encryption key, an encryption method, an authentication key, an authentication method, Passphrase, and a media access control (MAC) address of the printer 102.

In step S607, upon connecting to the wireless LAN network based on the connection parameters obtained by the wireless LAN communication unit 209 in the digital camera 101, the service execution unit 430 executes the service according to the procedures of the service transmitted in step S603. The service execution unit 430 executes the service via communication performed by the wireless LAN communication unit 308 in the wireless LAN network according to the obtained connection parameters. If none of the plurality of services included in the request message is executable according to the handover response message (NO in step S605), the process proceeds to step S608. In step S608, the service execution unit 430 displays a message indicating that print processing has failed on the display unit 201. The process then ends. A method of error notification is not limited to displaying the message, and the error may be notified of by vibration of the digital camera 101, speech, or lighting of a LED light.

On the other hand, if the digital camera 101 has connected to the printer 102 by NFC without the user selecting the service to be executed (NO in step S602), the process proceeds to step S609. In step S609, the NFC control unit 420 transmits the request message without including the service information to the printer 102 employing NFC.

In step S610, the NFC control unit 420 receives the handover response message from the printer 102. In step S611, the wireless LAN communication control unit 410 connects to the wireless LAN network according to the connection parameters of the wireless LAN included in the handover response message.

In step S612, upon connecting to the wireless LAN network, the wireless LAN communication control unit 410 performs a service search on the wireless LAN network and collects the information on the services supported by the communication apparatuses on the network. The service search is performed using a communication protocol such as a simple service discovery protocol (SSEP) and a multicast domain name system (mDNS).

In step S613, the service execution unit 430 determines whether there is a communication apparatus which supports the executable service as a result of the search performed in step S612. If there is such a communication apparatus (YES in step S613), the process proceeds to step S614. In step S614, the service execution unit 430 performs service selection processing. In step S615, the service execution unit 430 executes the selected service. For example, the selection processing in step S614 is performed by the user selecting a service name.

If there is no communication apparatus which supports the executable service as a result of the search performed in step S612 (NO in step S613), the process proceeds to step S616. In step S616, the service execution unit 430 displays a message indicating that print processing has failed on the display unit 201. The process then ends. The error notification method is not limited to displaying the message, and the error may be notified of by vibration of the digital camera 101, speech, or lighting if a LED light, similarly as in step S608.

Examples of the handover request message and the handover response message which are transmitted and received in the above-described processes will be described below with reference to FIGS. 12, 13, and 14.

Figure 12:
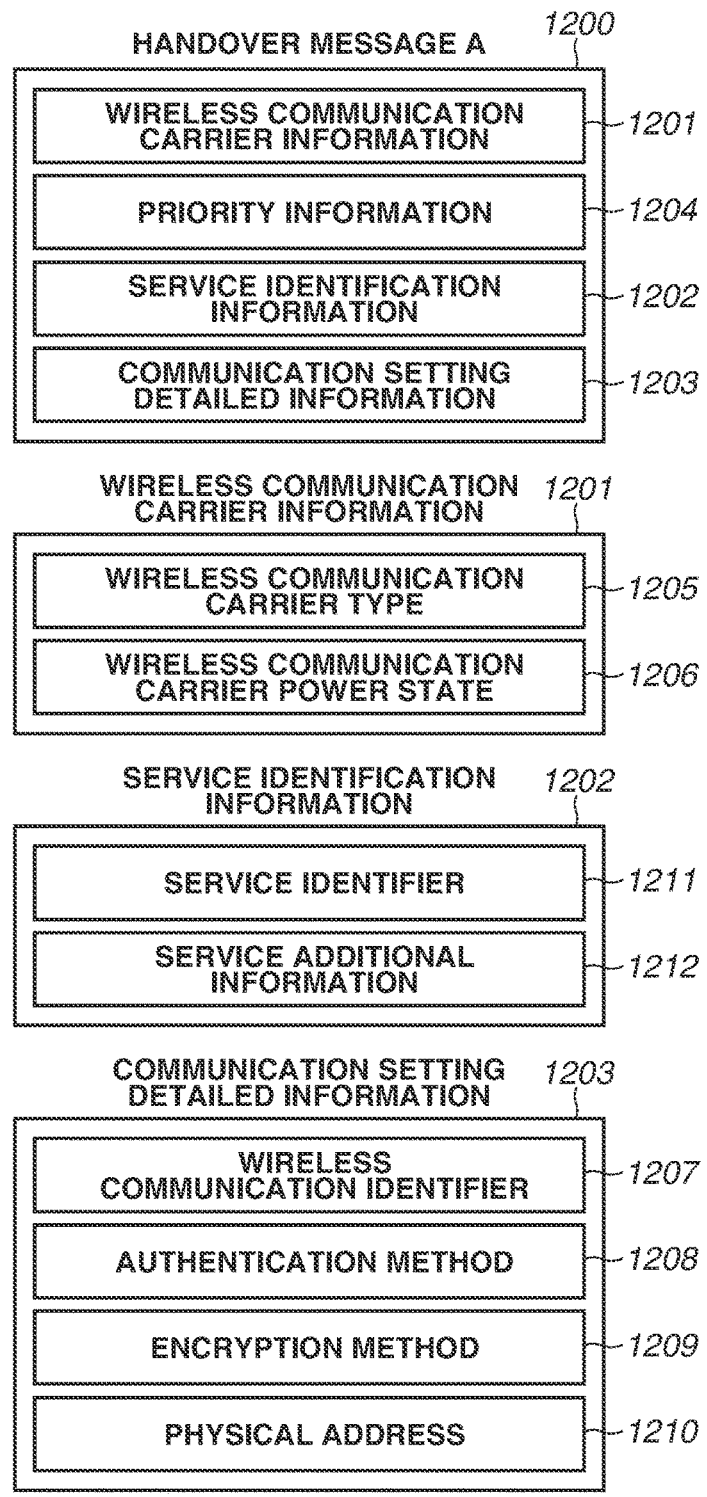
FIG. 12 illustrates a configuration of a handover message according to the exemplary embodiment.

FIG. 12 illustrates an example of a message format 1200. Referring to FIG. 12, a handover message A 1200 is largely divided into 4 parts, i.e., wireless communication carrier information 1201, service identification information 1202, communication setting detailed information 1203, and priority information 1204. The wireless communication carrier information 1201 includes a wireless communication type 1205 and a wireless communication carrier power state 1206. A carrier type, such as Wi-Fi, Wi-Fi IBSS, and Bluetooth (registered trademark), which the digital camera 101 or the printer 102 desires to be connected to for performing the services, is set in the wireless communication type 1205. Further, a power state indicating whether the interface of each wireless communication carrier is usable (i.e., is in an active state or an inactive state) is set in the wireless communication carrier power state 1206. The wireless communication carrier power state 1206 is used for notifying the connecting partner communication apparatus that the wireless communication carrier, set in the wireless communication carrier type 1205 and which is desired to be used, is inactive for some reason and thus cannot be used.

The service identification information 1202 includes a service identifier 1211 and service additional information 1212. The service identifier 1211 is an integer value for identifying the service to be performed by the digital camera 101 and the printer 102. The service additional information 1212 sets detailed information of the service to be associated with the service identifier 1211. Information such as an encoder format of the file to be printed, a print sheet size, a print color, and whether to perform two-sided printing is set to the service addition information 1212. According to the present exemplary embodiment, the service identification information 1202 is included in the handover request message.

The communication setting detailed information 1203 stores the connection parameters. More specifically, a wireless communication identifier 1207, an authentication method 1208, an encryption method 1209, and a physical address 1210 are set in the communication setting detailed information 1203. The wireless communication identifier 1207 is the identifier for identifying the wireless network and is referred to as SSID in the wireless LAN. The SSID can be set to the access point and each terminal in the wireless LAN, and the apparatus can be caused to communicate with only the terminals having a matching SSID.

In the authentication method 1208, an authentication method such as Extensible Authentication Protocol (EAP), EAP-Message Digest (MD) 5, EAP-Transport Layer Security (TLS), EAP-Tunneled TLS (TLS), and EAP-Protected Extensible Authentication Protocol (PEAP) is set. The encryption method 1209 is a security function for performing encryption of the data in the wireless LAN. The examples of the encryption method 1209 are Wired Equivalent Privacy (WEP), Wi-Fi Protected Access (WPA), WPA2, Temporal Key Integrity Protocol (TKIP), and Advanced Encryption Standard (AES).

The physical address 1210 is a physical address of a wireless communication interface, and a MAC address or Bluetooth (registered trademark) device address (BD_ADDR) of Bluetooth (registered trademark) is set thereto. According to the present exemplary embodiment, the connection parameters, i.e., the communication setting detailed information, are included in the handover response message.

The priority information 1204 indicates the priority of the service identification information 1202. If a plurality of pieces of the service identification information 1202 is stored, the priority information 1204 stores the information indicating the priority of each of the information. If the priority is not considered (not used), "NULL" or "0" is set to the priority information 1204.

Figure 13:
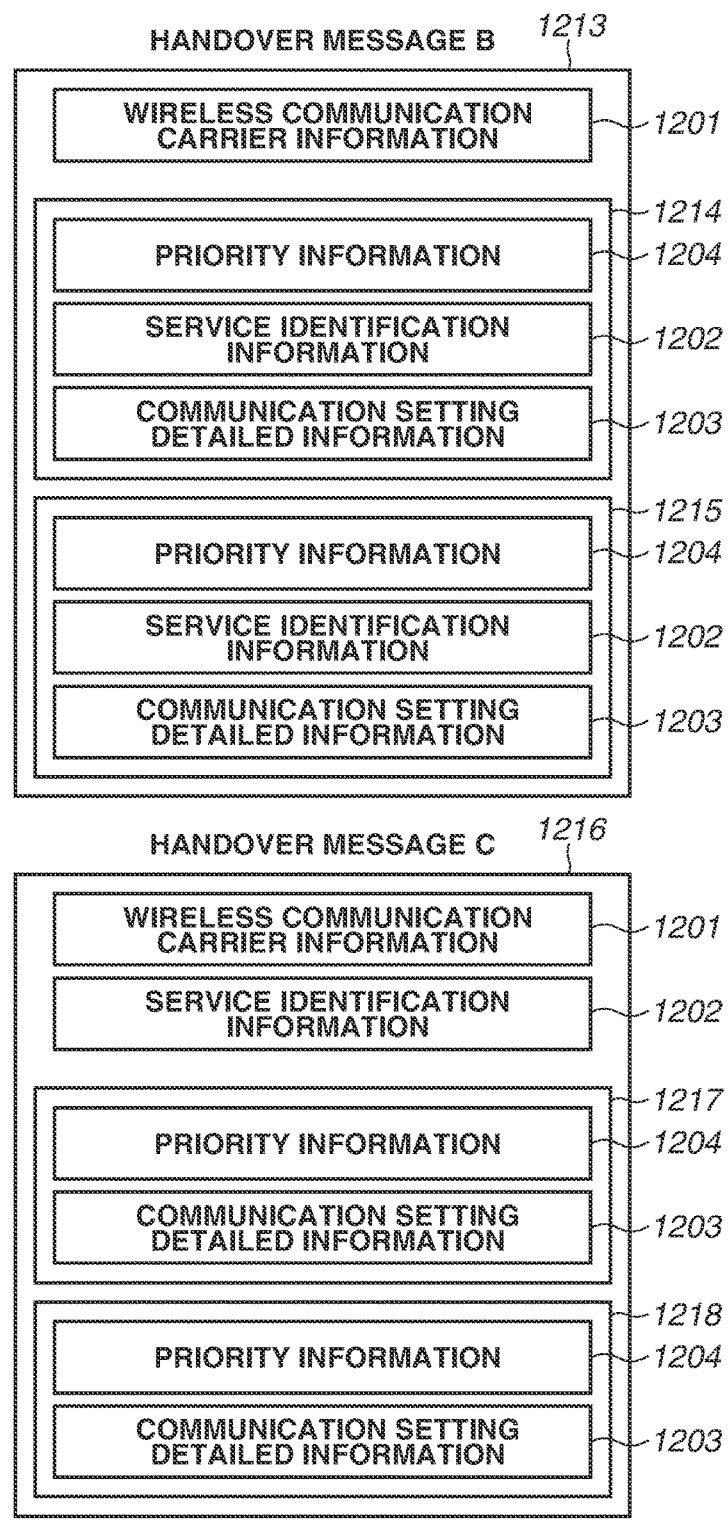
FIG. 13 illustrates another configuration of the handover message according to the exemplary embodiment.

FIG. 13 illustrates one of other examples of the message format, i.e., a handover message B 1213. Referring to FIG. 13, the priority information 1204, the service identification information 1202, and the communication setting detailed information 1203 are included in an information block indicated by one AUXILIARY_DATA_REFERENCE in the handover message B 1213.

Further, another one of other examples of the message format is illustrated as a handover message C 1216. The handover message C 1216 illustrates an example of setting the priority to each of a plurality of pieces of the communication setting detailed information 1203.

Figure 14:
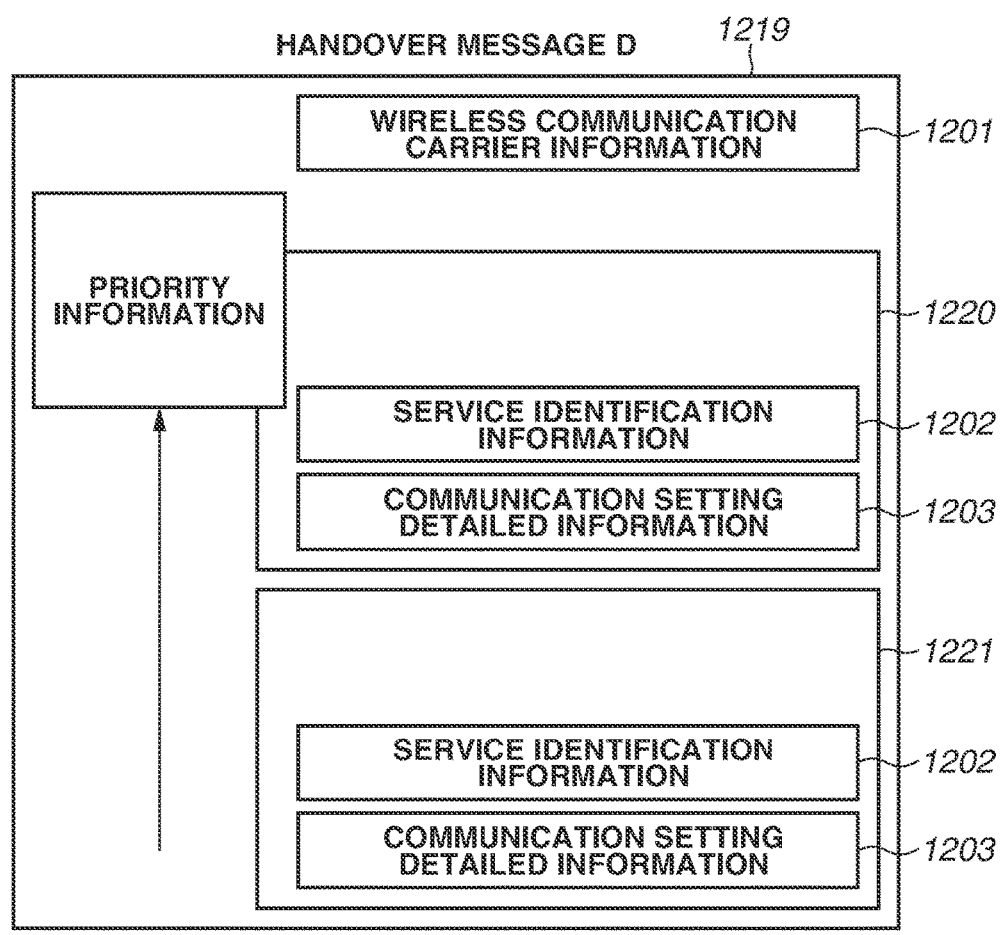
FIG. 14 illustrates another configuration of the handover message according to the exemplary embodiment.

FIG. 14 illustrates the other example of the message format, i.e., a handover message D 1219. Referring to FIG. 14, the handover message D 1219 includes the service identification information 1202 and the communication setting detailed information 1203 as one information block 1220, similarly as the handover message B 1213. However, the priority information is not added, and the priorities are determined by an arrangement of information blocks 1220 and 1221. In other words, the information block 1220 which is the top block is of higher priority. As a result, the priority information becomes unnecessary, and the handover message becomes compact.

Figure 7:
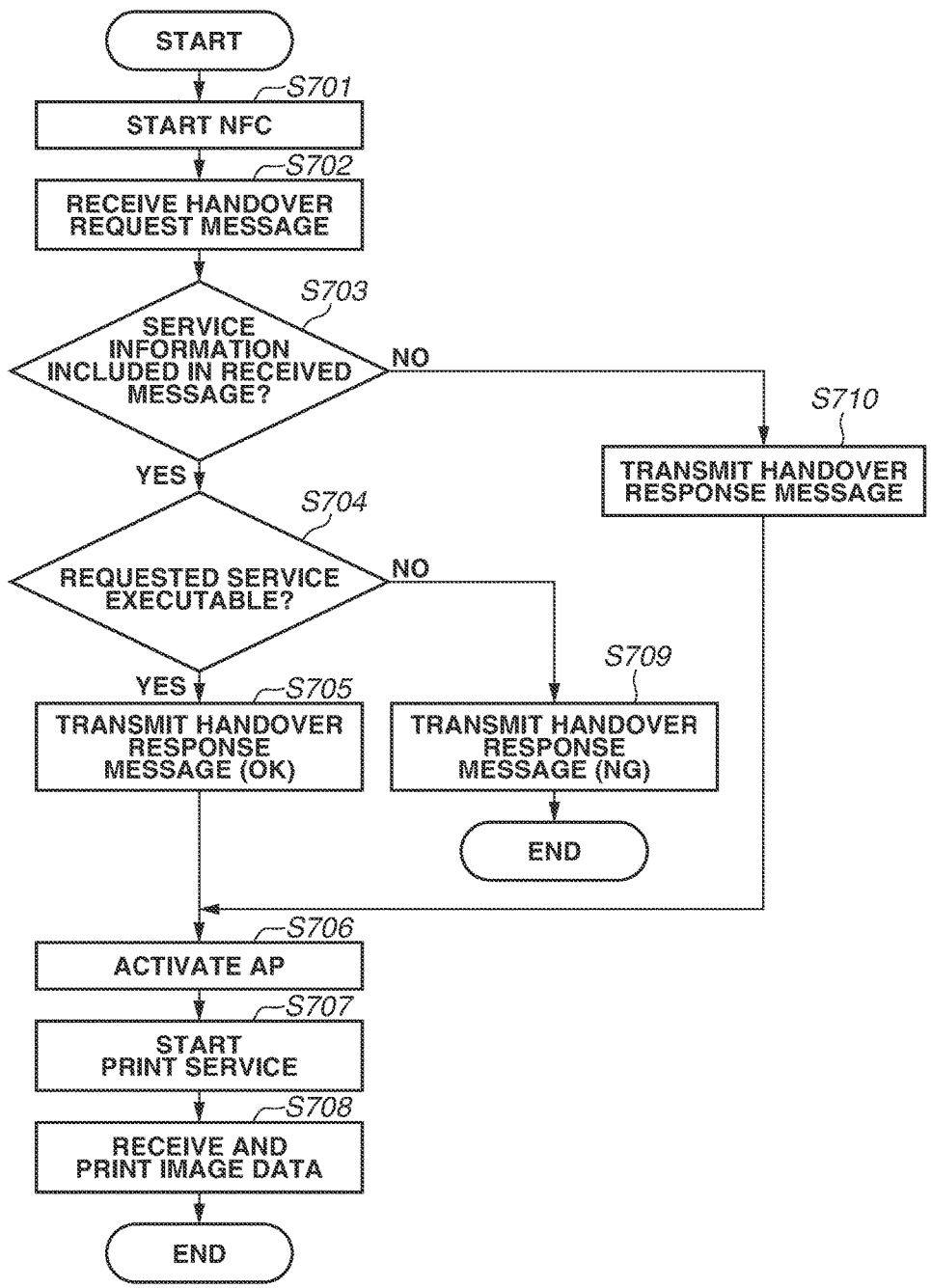
FIG. 7 is a flowchart illustrating an operation of a communication apparatus (i.e., a printer) according to the first exemplary embodiment.

FIG. 7 is a flowchart illustrating operation procedures of the printer 102 when the digital camera 101 and the printer 102 are brought close to each other.

In step S701, upon the NFC unit 520 detecting proximity of the NFC unit 210 in the digital camera 101, the printer 102 establishes communication with the digital camera 101 employing NFC. In step S702, the printer 102 receives, employing NFC, the handover request message that the digital camera 101 has transmitted in step S603 or step S609 of the flowchart illustrated in FIG. 6. In step S703, the printer 102 determines whether the information on the services is included in the received handover request message. If the information on the services is included (YES in step S703), the process proceeds to step S704. In step S704, the printer 102 determines whether the service is executable for each of the service information. If the service is executable (YES in step S704), the process proceeds to step S705. In step S705, the printer 102 adds information indicating that the service is executable to the handover response message, and transmits the handover response message to the digital camera 101.

On the other hand, if none of the services is executable (NO in step S704), the process proceeds to step S709. In step S709, the printer 102 adds information indicating that the service is not executable to the handover response message, and transmits the handover response message to the digital camera 101. The process then ends.

If the information of the services is not included in the handover request message received in step S702 (NO in step S703), the process proceeds to step S710. In step S710, the printer 102 transmits the handover response message which does not include the information on whether the service is executable to the digital camera 101. Further, the printer 102 includes the communication setting detailed information 1203 to the handover response message to be transmitted in step S705 and step S710. More specifically, the communication setting detailed information 1203 includes the connection parameters with respect to the communication method, after performing handover, to be employed when executing the service. If the digital camera 101 has notified the printer 102 of the service information with respect to a plurality of communication methods, and the printer 102 supports the plurality of communication methods, the printer 102 includes the connection parameters of each of the communication methods in the response message.

In step S706, the printer 102 uses the wireless LAN communication unit 510 to activate the access point function, and generates the wireless LAN network which matches connection information included in the response message. In step S707, the printer 102 starts to wait for the print service supported thereby.

If the information on the print service is designated in the handover request message received in step S702, the printer 102 starts to wait for the designated print service. On the other hand, if the information on the print service is not designated in the handover request message received in step S702, the printer 102 starts to wait for all of the print services supported thereby. The information on the service that the printer 102 has started to wait for is notified on the wireless LAN network generated in step S706, and the other communication apparatuses on the wireless LAN network are to search for the information. In step S708, the printer 102 receives the image data transmitted from the digital camera 101 and prints the image data.

Figure 8:
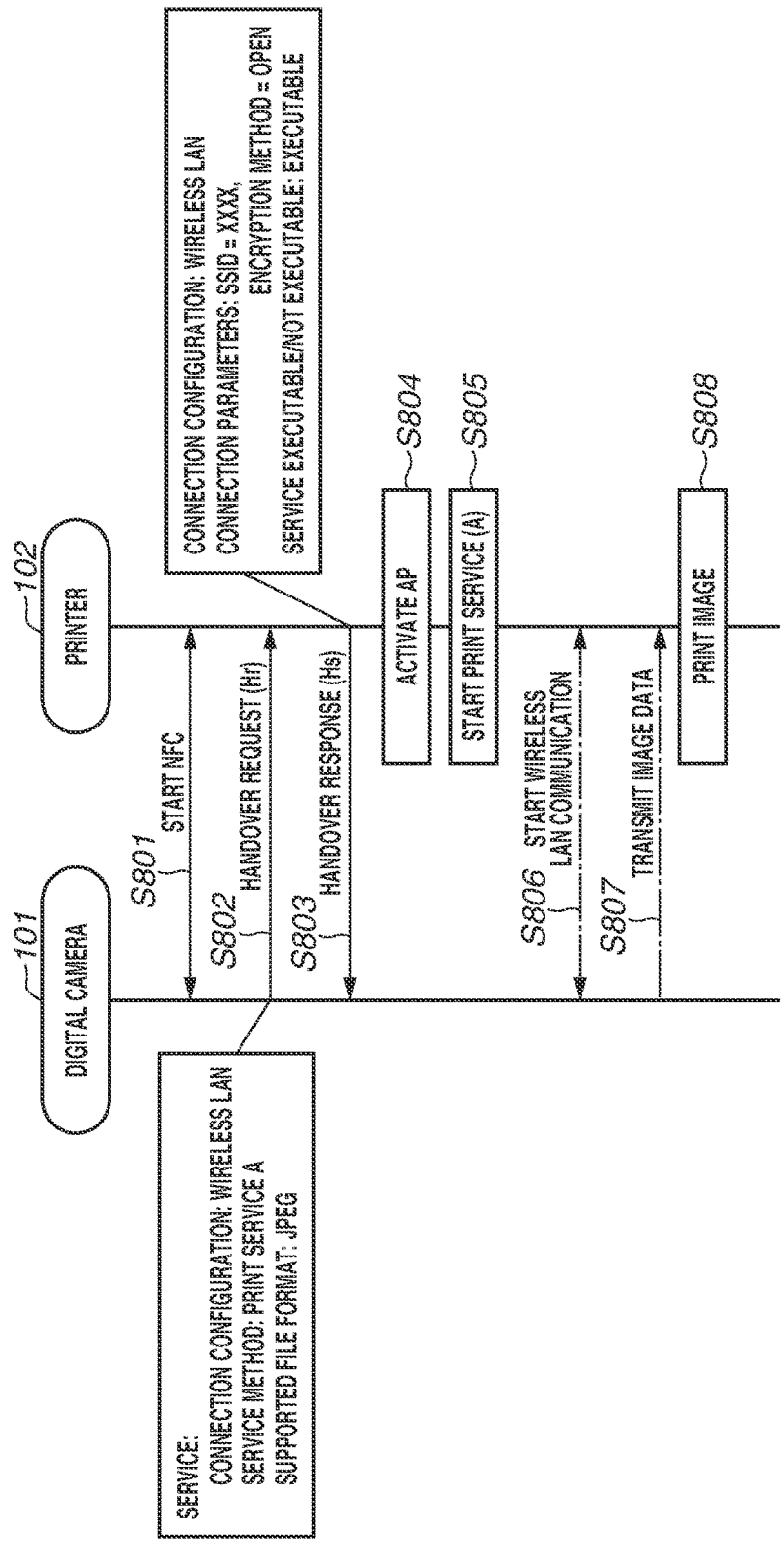
FIG. 8 illustrates an example of a communication sequence between the digital camera and the printer according to the first exemplary embodiment.

An example of a communication sequence between the digital camera 101 and the printer 102 will be described below with reference to FIG. 8.

In step S801, the digital camera 101 and the printer 102 are brought close to each other, so that NFC is established between the digital camera 101 and the printer 102. In step S802, the digital camera 101 transmits the handover request message to the printer 102. The information indicating that the digital camera 101 desires to print a Join Photographic Experts Group (JPEG) file using "print service A", "color printing", and wireless LAN communication is of the highest priority is added to the handover request message. Further, the information indicating that the digital camera 101 desires to print a JPEG file using "print service A", "monochrome printing", and wireless LAN communication is of the second priority is added to the handover request message.

In step S803, the printer 102 which has received the handover request message then transmits the handover response message to the digital camera 101. The handover response message includes the information indicating whether the service included in the handover request message is executable by the printer 102 and the wireless LAN network information generated by the printer 102. It is assumed that the printer 102 supports both "color printing of print service A" and "monochrome printing of print service A". In other words, the printer 102 transmits the message including the parameters indicating that "color printing of print service A" and "monochrome printing of print service A" are executable.

In step S804, the printer 102 activates the access point function and generates the wireless LAN network which matches the wireless LAN network information transmitted in step S803. In step S805, the printer 102 starts waiting for the print service using "print service A".

On the other hand, in step S806, the digital camera 101 which has received the handover response message in step S803 searches for and connects to the wireless LAN network included in the received message. Upon connecting to the wireless LAN network, in step S807, the digital camera 101 transmits the image data to be printed to the printer 102. More specifically, the digital camera 101 transmits the image data to be printed according to predetermined procedures for performing color printing using the print service A, i.e., the service of the highest priority among the services executable by the printer 102. In step S808, the printer 102 prints the received image data.

As described above, according to the present exemplary embodiment, the service information and the priority are added to the handover request message as the auxiliary information. The communication partner can thus be notified of the priority of each of a plurality of pieces of the auxiliary information. The communication partner then automatically starts the service of the highest priority among the executable services, so that it becomes unnecessary for the user to designate the service to be executed after confirming the service executable by the communication partner. Operability is thus improved.

Second Exemplary Embodiment

According to the first exemplary embodiment, the apparatus which desires to use a service transmits a message to the apparatus which provides the service by adding the priority information to the information on the service. According to a second exemplary embodiment, the apparatus which provides the service transmits the priority of the information on the services supported thereby to the apparatus which desires to use the service, and agrees on the information of the service to be executed.

Figure 9:
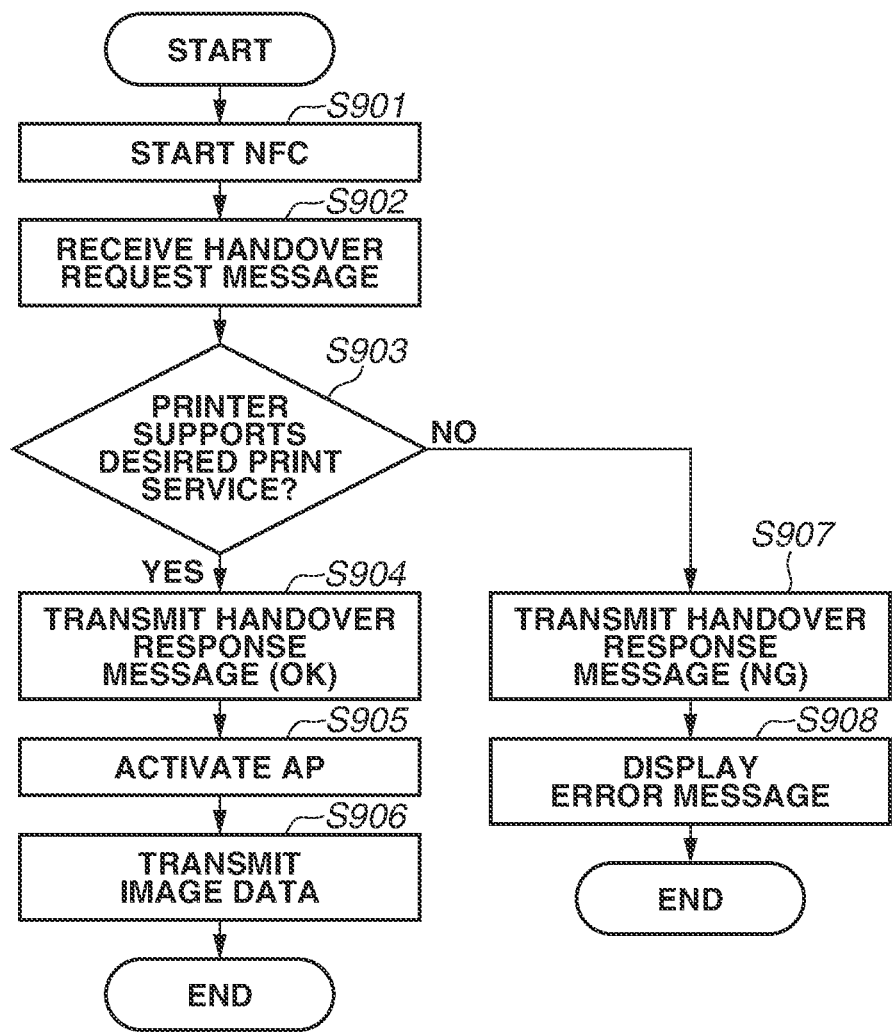
FIG. 9 is a flowchart illustrating an operation of a communication apparatus (i.e., a digital camera) according to a second exemplary embodiment of the present invention.

The details of the second exemplary embodiment will be described below with reference to FIGS. 9, 10, and 11. FIG. 9 is a flowchart illustrating operation procedures of the digital camera 101 when the digital camera 101 and the printer 102 are brought close to each other by the user operation. In step S901, upon detecting proximity of the NFC unit 309 in the printer 102, the NFC control unit 420 in the digital camera 101 establishes communication employing NFC with the printer 102.

In step S902, the digital camera 101 receives a handover request message from the printer 102 via NFC and analyzes the content of the message. The received handover request message includes an identifier and the priority of a service supported by the printer 102.

In step S903, the digital camera 101 determines whether the printer 102 supports the service desired by the digital camera 101. More specifically, if the handover request message received in step S902 includes information on the service executable by the digital camera 101, the digital camera 101 determines that the printer 102 supports the service desired thereby. On the other hand, if the received handover request message does not include information on the service executable by the digital camera 101, the digital camera 101 determines that the printer 102 does not support the service desired thereby.

If the received handover request message includes information on the service executable by the digital camera 101 (YES in step S903), the process proceeds to step S904. In step S904, the digital camera 101 transmits a handover response message including the information indicating that the notified service is executable to the printer 102. The digital camera 101 transmits the handover response message including connection parameters for connecting with respect to a communication method to be employed when executing the service. The connection parameters include connection information of the wireless LAN network (e.g., SSID, an encryption type, and encryption key information).

If the digital camera 101 is notified of the service information with respect to a plurality of communication methods from the printer 102, and the digital camera 101 supports the plurality of communication methods, the digital camera 101 makes the response message include the connection parameters of each of the plurality of communication methods. Further, the priority can be added to the communication setting detailed information 1203 as in the handover message C 1216 illustrated in FIG. 13 in the handover response message to be transmitted. For example, the plurality of connection parameters and the priorities thereof may be added for each communication security state.

In step S905, the digital camera 101 activates an access point function using the wireless LAN communication control unit 410 and generates the wireless LAN network which matches the connection information included in the response message. In step S906, the digital camera 101 waits for the printer 102 to connect to the wireless LAN network, and transmits the image data to be printed according to the procedures of the desired service among the services received in step S902 to the printer 102.

If the handover request message does not include information on the desired service (NO in step S903), the process proceeds to step S907. In step S907, the digital camera 101 transmits a response message including the information indicating that the service is not to be executed to the printer 102. In step S908, the digital camera 101 displays error information.

Figure 10:
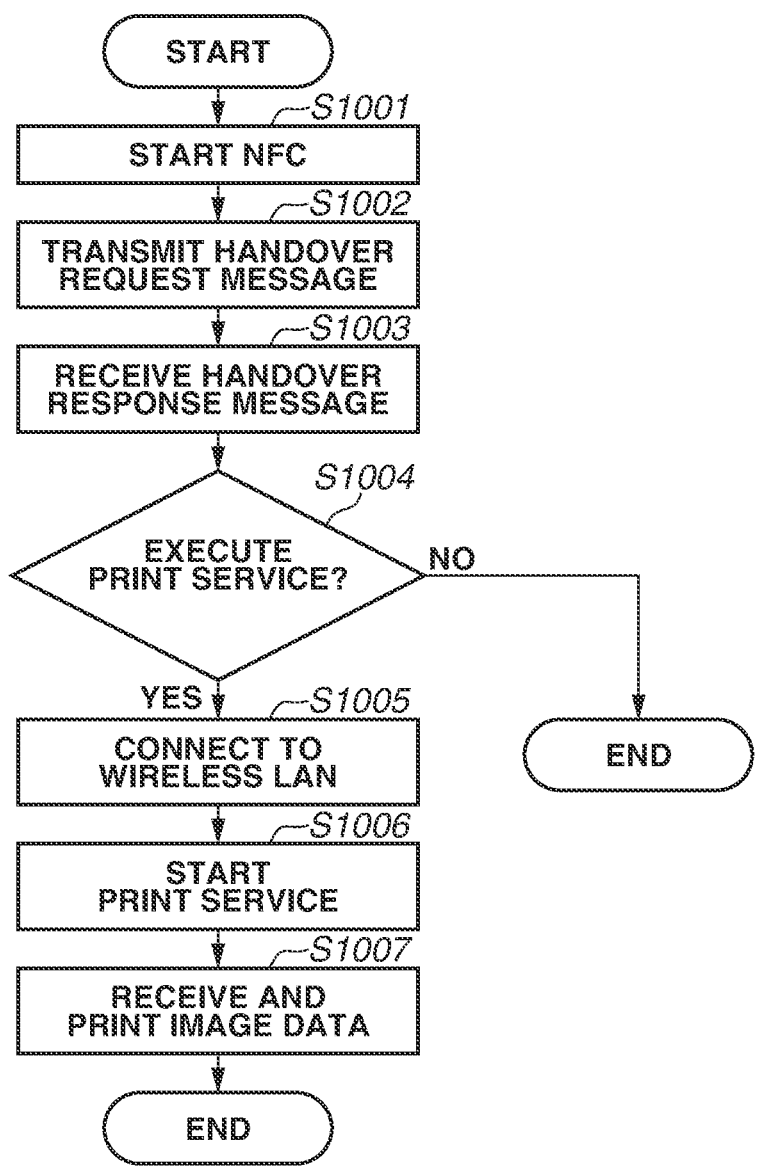
FIG. 10 is a flowchart illustrating an operation of a communication apparatus (i.e., a printer) according to the second exemplary embodiment.
Figure 11:
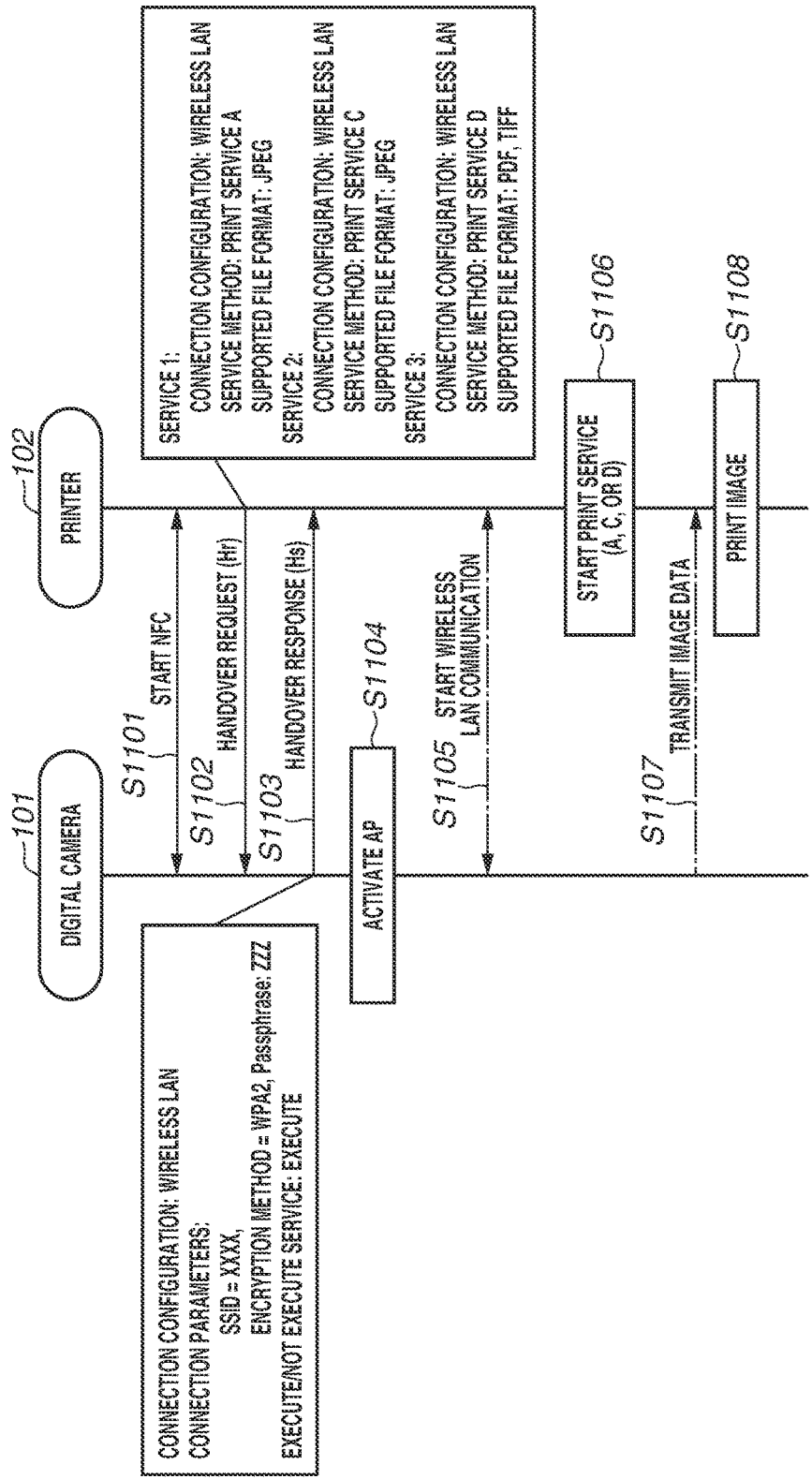
FIG. 11 illustrates an example of a communication sequence between the digital camera and the printer according to the second exemplary embodiment.

FIG. 10 is a flowchart illustrating operation procedures of the printer 102 when the digital camera 101 and the printer 102 are brought close to each other. In step S1001, upon the NFC unit 520 detecting proximity of the NFC unit 210 in the digital camera 101, the printer 102 establishes communication employing NFC with the digital camera 101.

In step S1002, the printer 102 transmits the handover request message including the identifier information and the priorities of the services supported thereby to the digital camera 101 employing NFC. According to the present exemplary embodiment, the printer 102 supports three print services, i.e., "print service A", "print service C", and "print service D". The handover request message thus includes information on the three services and the priorities thereof.

In step S1003, the printer 102 receives the response message from the digital camera 101 via NFC and analyzes the content of the message.

In step S1004, the printer 102 determines whether to execute the print service based on the received handover response message. More specifically, if the received handover response message includes information indicating that the service included in the transmitted handover request message is executable, the printer 102 determines to execute the service. If the received handover response message does not include information indicating that the service included in the transmitted handover request message is executable, the printer 102 determines not to execute the service. The printer 102 then determines to execute the service of the highest priority among the services indicated to be executable in the received handover response message without further receiving the user operation.

If the received handover response message includes the service executable by the digital camera 101 (YES in step S1004), the process proceeds to step S1005. In step S1005, the printer 102 connects to the wireless network according to the connection parameters associated with the information indicating that the service is executable. In step S1006, upon connecting to the wireless LAN network, the printer 102 starts to wait for the print service that the printer 102 has transmitted to the digital camera 101 in step S1002. In step S1007, the printer 102 receives and prints the image data transmitted from the digital camera 101.

On the other hand, if the printer 102 determines that the received response message includes the information indicating that the digital camera 101 is not to execute the service (NO in step S1004), the process ends without the printer 102 performing a process.

Further, if the received response message indicates that there is no executable service (NO in step S1004), the printer 102 may re-transmit the handover request message including new priority information 1204 and service information to the digital camera 101. The printer 102 may thus start a negotiation for requesting a new handover response message to be returned thereto.

An example of the communication sequence between the digital camera 101 and the printer 102 will be described below with reference to FIG. 11.

In step S1101, the digital camera 101 and the printer 102 are brought close to each other, so that NFC is established between the digital camera 101 and the printer 102. In step S1102, the printer 102 transmits the handover request message to the digital camera 101. The information indicating that the printer 102 supports "print service A", "print service C", and "print service D" is included in the request message. Further, the priority information indicating that the printer 102 is to execute the services in an order of "print service A", "print service C", and "print service D" is included in the request message. Furthermore, the information indicating that each of the print services is executable employing the wireless LAN communication is added to the communication setting detailed information 1203 in the request message.

In step S1103, the digital camera 101 receives the handover request message. The digital camera 101 then transmits the handover response message including the information indicating that the services notified of in step S1102 are executable to the printer 102. The response message includes the wireless LAN network information (i.e., SSID, the encryption method, and passphrase) generated by the digital camera 101.

In step S1104, the digital camera 101 activates the access point function, generates the wireless LAN network which matches the wireless LAN network information transmitted in step S1103, and starts waiting for the printer 102 to connect. In step S1105, upon receiving the handover response message transmitted in step S1103, the printer 102 searches for and connects to the wireless LAN network included in the message. In step S1106, upon connecting to the wireless LAN network, the printer 102 starts to wait for the print service using "print service A", "print service C", or "print service D".

In step S1107, upon detecting that the printer 102 has connected to the wireless LAN network in step S1105, the digital camera 101 transmits the image data to be printed according to the procedure of "print service A", i.e., the service of the highest priority, to the printer 102. In step S1108, the printer 102 prints the received image data.

As described above, according to the present exemplary embodiment, the service information and the priority are added to the handover request message as the auxiliary information. The communication partner can thus be notified of the priority of each of a plurality of pieces of the auxiliary information. The communication partner then automatically starts the service of the highest priority among the executable services, so that it becomes unnecessary for the user to designate the service to be executed after confirming the service executable by the communication partner. The operability is thus improved.

The exemplary embodiments of the present invention have been described above. However, the present invention is not limited to the exemplary embodiments described in the specification and in the drawings, and may be modified within the range of not altering the gist of the invention and implemented.

According to the above-described exemplary embodiments, the wireless communication method for performing handover from the NFC is the wireless LAN. However, the present invention is not limited thereto, and, for example, handover may be performed with regard to communication employing Bluetooth (registered trademark).

Further, according to the above-described exemplary embodiments, wireless LAN communication is performed by one of the communication apparatuses becoming the access point and transmitting the connection parameters. However, the present invention is not limited thereto. Communication may be performed via an external access point or by an ad-hoc mode. Moreover, wireless LAN communication may be performed by employing Wi-Fi Direct connection procedures between the communication apparatuses.

Furthermore, according to the above-described exemplary embodiments, the system includes the digital camera 101 and the printer 102. However, the above-described processes may be performed using other devices. Moreover, the information on the services transmitted and received between the communication apparatuses is not limited to the services related to printing. For example, the information related to services such as an image transmission service, a moving image reproduction service, and an image scan service may be transmitted and received. Further, a plurality of the above-described services may be collectively transmitted and received.

Furthermore, according to the above-described exemplary embodiments, the information indicating that the service is not to be executed is included in the handover response message for notifying that the service included in the handover request message is not to be executed. However, the present invention is not limited thereto. In other words, other methods may be performed as long as the communication apparatus transmitting the handover request message is capable of detecting that the service included in the request message is not to be executed on a receiving side. For example, the communication apparatus transmitting the handover request message may be notified according to the receiving side not transmitting the handover response message or by transmitting a message other than Handover Select.

Moreover, according to the above-described exemplary embodiments, the identifier of the service to be transmitted and received employing NFC is a unique integer value. However, the present invention is not limited thereto. For example, the identifier may be character string information such as a name of the service. Further, the identifier may be identification information associated with a group of a plurality of services.

According to the present invention, the communication apparatus is capable of notifying of the priority of each of the plurality of pieces of auxiliary information included in the record for indicating the communication method to which handover can be performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193042 filed Sep. 18, 2013, which is hereby incorporated by reference herein in its entirety.

The invention claimed is:

1. A communication apparatus comprising:
a first communication unit configured to perform wireless communication with another communication apparatus using a first communication method;
a second communication unit configured to perform wireless communication for performing communication processing with the another communication apparatus using a second communication method which is different from the first communication method;
a setting unit configured to set priority to each of a plurality of communication processing associated with a record which is used for performing handover from the first communication method to the second communication method and which is for designating the second communication method;
a transmission unit configured to transmit information of the plurality of communication processing indicating the priority set by the setting unit associated with the record to the another communication apparatus via the first communication unit; and
a determination unit configured to determine, based on a response message with respect to the record, whether to perform handover to the second communication method.

2. The communication apparatus according to claim 1, wherein each of the information of the plurality of communication processing includes information on a service to be executed by communication using the second communication method.

3. The communication apparatus according to claim 1, wherein the record includes a connection parameter for connecting to the another communication apparatus using the second communication method.

4. The communication apparatus according to claim 1, wherein the determination unit determines to perform, when the response message includes information indicating that the another communication apparatus is capable of executing at least one of the plurality of communication processing, handover to the second communication method.

5. The communication apparatus according to claim 1, wherein, when the determination unit determines not to perform handover to the second communication method, an error is notified to a user.

6. The communication apparatus according to claim 1, wherein the first communication unit performs communication using near field communication (NFC).

7. The communication apparatus according to claim 1, wherein the second communication method is Institute of Electrical and Electronic Engineers (IEEE) 802.11 series.

8. The communication apparatus according to claim 1, wherein the record is ALTERNATIVE_CARRIER_RECORD.

9. The communication apparatus according to claim 1, wherein the information of the plurality of communication processing is information indicated by AUXILIARY DATA REFERENCE.

10. A control method of a communication apparatus including a first communication unit configured to perform wireless communication with another communication apparatus using a first communication method and a second communication unit configured to perform wireless communication for performing communication processing with the another communication apparatus using a second communication method which is different from the first communication method, the control method comprising:
setting priority to each of a plurality of communication processing associated with a record which is used for performing handover from the first communication method to the second communication method and which is for designating the second communication method;
transmitting information of the plurality of communication processing indicating the set priority associated with the record to the another communication apparatus via the first communication unit; and
determining, based on a response message with respect to the record, whether to perform handover to the second communication method.

11. A non-transitory computer readable storage medium storing a program for a causing computer to execute a control method of a communication apparatus including a first communication unit configured to perform wireless communication with another communication apparatus using a first communication method and a second communication unit configured to perform wireless communication for performing communication processing with the another communication apparatus using a second communication method which is different from the first communication method, the control method comprising:
setting priority to each of a plurality of communication processing associated with a record which is used for performing handover from the first communication method to the second communication method and which is for designating the second communication method;
transmitting information of the plurality of communication processing indicating the set priority associated with the record to the another communication apparatus via the first communication unit; and
determining, based on a response message with respect to the record, whether to perform handover to the second communication method.

* * * * *